(No Model.)
H. I. HARRIS.
GALVANIC BATTERY.
No. 367,294. Patented July 26, 1887.
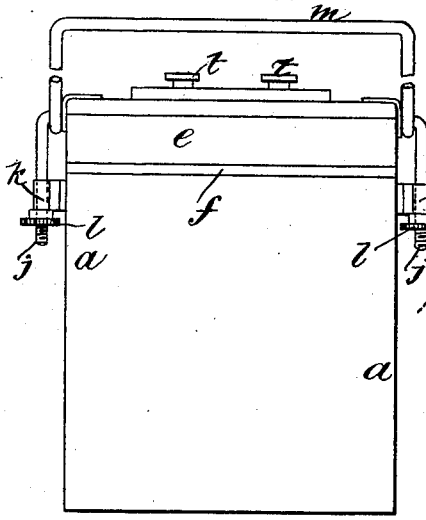
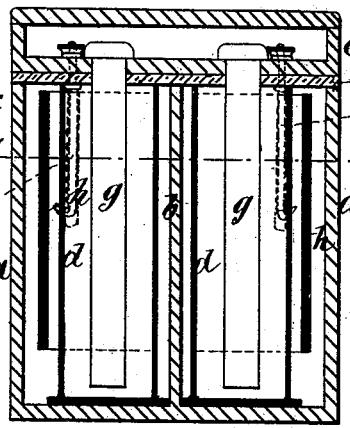
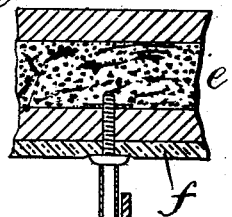
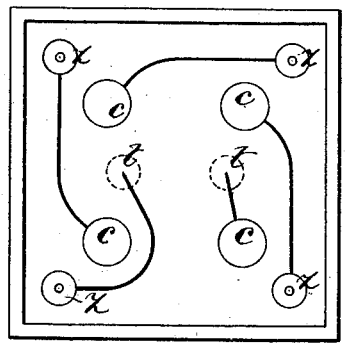
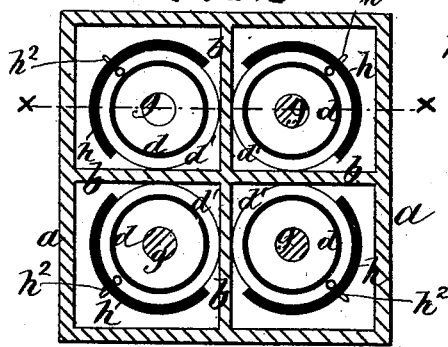
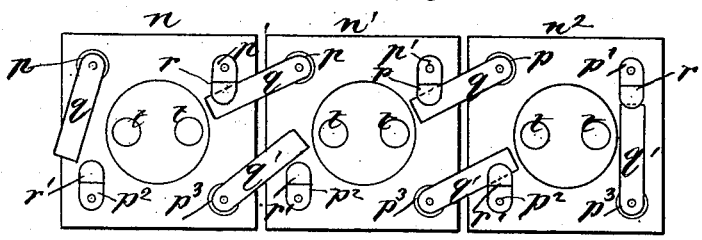
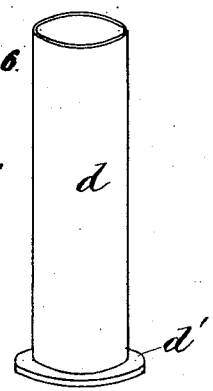
Witnesses:
Inventor:
Henry I. Harris
by Marcellus Bailey
his attorney.

UNITED STATES PATENT OFFICE.

HENRY INKSON HARRIS, OF ISLINGTON, COUNTY OF MIDDLESEX, ASSIGNOR TO JOHN JOSEPH WALSH, OF LONDON, ENGLAND.

GALVANIC BATTERY.

SPECIFICATION forming part of Letters Patent No. 367,294, dated July 26, 1887.

Application filed June 6, 1887. Serial No. 240,372. (No model.) Patented in England July 7, 1885, No. 8,228, and March 30, 1887, No. 4,744.

*To all whom it may concern:*

Be it known that I, HENRY INKSON HARRIS, electrician, a subject of the Queen of Great Britain and Ireland, residing at 41 Essex street, Islington, in the county of Middlesex, England, have invented certain new and useful Improvements in Voltaic Batteries, (for which British Letters Patent dated July 7, 1885, No. 8,228, have been granted to me, and for which I have applied for a patent, also, in Great Britain on March 30, 1887, No. 4,744,) of which the following is a specification.

My improved battery is constructed substantially in practice in the following manner: A wooden box about six inches square by about six inches deep is divided by vertical partitions into four compartments, forming four cells of equal capacity, and the inner sides of the said cells are coated with paraffine or other suitable substance in the usual way. A porous cell about five and a half inches long by about one and a half inch diameter, provided with a flange or foot at the bottom, is placed in each wooden cell, and paraffine or other suitable composition being poured into the bottom of the cell, holds the said porous cells firmly in position, so that the battery may be inverted without affecting them.

The battery is provided with a wooden cover faced with sheet india-rubber and held down by bolts and nuts, or other suitable devices, and the tops of the porous cells being flush with the tops of the wooden cells the various compartments and cells are effectually sealed. Four carbon rods about five inches long by about three-eighths of an inch diameter are held firmly by one end in holes in the said cover, and enter the porous pots; also affixed to the cover are zinc elements about four inches deep, which dip into the wooden cells and may surround the porous pots.

The battery is preferably charged with the following ingredients: eight parts sulphuric acid are added to eight parts of water, and sodium nitrate is dissolved to saturation therein. One part of potassium bichromate is then added, and the resulting solution is placed in the porous cells. I may, however, dispense with the potassium bichromate, if desired. The outer cells are charged with dilute sulphuric acid. By reason of the india-rubber employed to close the tops of the cells, as hereinbefore mentioned, the battery will work equally well when inverted, as none of the solutions can escape or mix with each other.

The cover of the battery is made hollow and the connections between the zincs and carbons are within such hollow cover and are all well coated with paraffine or other suitable composition after being made.

The composition which I find gives the best result in practice, and which I prefer to use for this purpose, as also for the lining of the wooden cells before mentioned, consists of one part of bitumen and one and a half part of wax, preferably that known as "vegetable" or "Japan" wax. These ingredients are melted together and applied in the usual way.

The cells are preferably coupled in series, and a set of four cells of the dimensions described will give, when thus coupled, a constant current of about 3.4 ampères for twelve hours with an electro-motive force of about 6.953 volts, and in practice I make use of a battery of this size as a standard battery.

I wish it to be understood that in place of wood I may employ vulcanite, gutta-percha, glass, or other suitable substance or material of which to construct the outer cells, and that I do not necessarily confine myself to the exact forms, dimensions, nor proportions of the various parts as described, though I find such to be the most convenient in practice.

Upon the outer side of the cover of the battery are two metal studs which form the terminals of the circuit, and to the said studs the wires from a lamp, electromotor, or other electrical apparatus may be attached. The said metal studs are either connected with the four cells in series or are each connected with two cells in series; but in the latter case the wire from the second cell of each such pair is led to a stud on the outside of the cover, to which stud is pivoted a flat metal strip. The said strips are of such a size that when turned round into line with each other their ends overlap or otherwise make contact, and thus complete the circuit. Two more similarly-pivoted metal strips are also provided, connected to the wires leading to the terminals, and when these latter are also in contact the battery is short-circuited.

In place of constructing my improved battery with four cells only, I may make it with eight, twelve, or other larger number desired, and in such cases I prefer to keep the battery only two cells in width and to add the extra cells in the length, and for greater convenience I divide the cover into two parts, each such part covering four cells only, and being provided with two central terminals and four pivoted contact-plates, as before described, and by these means a greater or less number of the cells can be readily combined or cut out, as desired, or certain of the cells may be combined and used for one purpose, and certain other of the cells may be used for another purpose. Thus one set of four may be used to light a lamp, another set to work a motor, and so on.

The battery is so arranged that a handle can be attached to it for carrying about, and by fixing an incandescent lamp on the cover it thus becomes a convenient miner's lamp.

In the accompanying sheet of drawings, Figure 1 is a side elevation. Fig. 2 is a sectional elevation through the line X X on Fig. 3, and Fig. 3 is a cross-section on the line Y Y on Fig. 2, of a voltaic battery constructed according to my invention. Fig. 4 is a plan of the cover of the same with the top removed, showing the connections. Fig. 5 is a plan of the top of a voltaic battery of twelve cells constructed according to my invention, showing the electrical connections between the cells. Fig. 6 is a perspective view of a porous cell constructed according to my invention, and Fig. 7 is a sectional detail showing the mode of supporting the zincs.

Similar letters refer to similar parts throughout the drawings.

$a$ is the box or outer case of the battery divided into four cells by vertical partitions $b$.

$d\,d$ are the porous cells, constructed with a flange or foot, $d'$, by which means they are securely retained within the cells by the composition, as before described.

$c$ is the cover of the battery faced with india-rubber, $f$.

$g\,g$ are the carbon rods, secured in holes in the cover $e$, and $h\,h$ are the zinc elements provided with holes at $i^2$, by which they are suspended on copper hooks $h^2$, each screwed into the head or cover $e$, and having a contact at Z.

$h^3$, Fig. 7, is a tube, of india-rubber or other insulating material, covering the stem or upper part of the hook, to prevent the hook coming into contact with the element except at the proper part.

By suspending the elements from their central parts, as shown, I obtain greater freedom from local action and from internal resistance. The like arrangement may be used for suspending or supporting other than zinc elements. The zincs, as shown in the drawings, partly surround the porous cells; but I do not necessarily confine myself to any particular form.

In Fig. 4, $c\,c\,c\,c$ are the extremities of the carbon rods. $z\,z\,z\,z$ are the terminals of the zincs, and the dotted circles $t\,t$ are the terminal studs on the outside of the cover, as shown in Fig. 1. The connections are indicated by the thick black lines. In this case the four cells are, as will be seen, connected in series with the terminals $t\,t$.

In Fig. 1, $j\,j$ are two screws on the cover $e$, which enter eyes $k\,k$, affixed to the battery. Nuts $l\,l$ are provided so that the cover can be held tightly in position, and thus, by means of the india-rubber, make a perfect joint with the tops of the cells and the porous pots, as before described. $m$ is a handle pivoted to $j\,j$, by means of which the apparatus may be conveniently carried about.

In Fig. 5, $n\,n'\,n^2$ are three batteries of four cells each, made similarly to that shown in Figs. 1, 2, 3, and 4, with the exception that in each battery instead of all the four cells being connected in series with their respective terminals, two cells only are coupled in series with each terminal, and on each cover four studs, $p\,p'\,p^2\,p^3$, are provided. $p\,p^3$ have contact-plates $q\,q'$ pivoted to them, while short contact-plates $r\,r'$ are affixed to the studs $p'$ $p^2$. Of the aforesaid studs, $p'\,p^3$ are connected with the second of each pair of cells, while $p$ $p^2$ are connected with the terminals $t\,t$. It will clearly be seen that by means of these pivoted contact-plates the cells may, as previously described in this my specification, be coupled up in a variety of ways to suit different purposes. In practice I prefer to provide in the cover of the battery small outlets for the escape of gas from the porous cells only.

I wish it to be understood that I do not necessarily confine myself to the exact shape or proportions of the various parts of my improved battery, as shown in the said drawings.

Having now particular described and ascertained the nature of my said invention and in what manner the same is to be performed, I declare that what I claim is—

1. In a voltaic battery, the porous cell $d$, having a flange or foot, $d'$, in combination with the compartment containing the same and the sealing composition, whereby said cell is secured in place, as and for the purposes shown and described.

2. The combination, with two or more voltaic batteries, each containing pairs of cells, as described, of terminals $t$, contact-plates $r$ $r'$, and hinged or pivoted contact-plates $q\,q'$, arranged for operation, substantially as hereinbefore described and illustrated.

3. In electric batteries, the combination, with the zinc or other element, of a supporting-hook therefor, engaging with said element at the center thereof, or thereabout, as and for the purposes as hereinbefore described.

4. The combination of the insulating-cover $e$, the zinc plate $h$, and the plate-supporting hook $h^2$, as herein shown and specified.

5. In an electric battery, a suspended zinc element supported and held at or about its central portion, as and for the purposes hereinbefore set forth.

6. The combination of the hollow insulating-cover $e$, containing the connections and faced with rubber $f$, or the like, the box $a$, divided into compartments constituting cells, the zinc and carbon elements $g\ h$, contained in said cells and supported from the cover in the manner described, and the porous cells $d$, having their tops flush with those of the compartments, so that both may be tightly closed by the cover, these parts being constructed, arranged, and fitted together in the manner hereinbefore shown and described.

In testimony whereof I have signed my name to this specification in the presence of two subscribing witnesses.

HENRY INKSON HARRIS.

Witnesses:
    THOMAS NORTH,
      *The White House, Telegraph St., E. C.*
    E. A. HALL,
      *9 Birchin Lane, E. C.*